United States Patent
Bird

(10) Patent No.: US 10,507,718 B2
(45) Date of Patent: Dec. 17, 2019

(54) HYBRID TRANSAXLE

(71) Applicant: Ford Global Technologies, LLC, Dearborn, MI (US)

(72) Inventor: Norman Jerry Bird, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 15/433,165

(22) Filed: Feb. 15, 2017

(65) Prior Publication Data

US 2018/0229596 A1   Aug. 16, 2018

(51) Int. Cl.
| | | |
|---|---|---|
| *B60K 6/365* | (2007.10) | |
| *B60K 6/44* | (2007.10) | |
| *B60K 6/445* | (2007.10) | |
| *F16H 3/72* | (2006.01) | |
| *F16H 37/08* | (2006.01) | |

(52) U.S. Cl.
CPC .......... *B60K 6/365* (2013.01); *B60K 6/44* (2013.01); *F16H 37/0833* (2013.01); *B60Y 2400/73* (2013.01); *Y10S 903/91* (2013.01)

(58) Field of Classification Search
CPC ...... B60K 6/365; B60K 6/44; B60K 37/0833; B60Y 2400/73; F16H 3/72; F16H 3/727
See application file for complete search history.

(56) References Cited

U.S. PATENT DOCUMENTS

| | | | | |
|---|---|---|---|---|
| 5,775,449 A | * | 7/1998 | Moroto | B60K 6/365 180/65.235 |
| 5,788,006 A | * | 8/1998 | Yamaguchi | B60K 6/365 180/65.235 |
| 6,558,283 B1 | * | 5/2003 | Schnelle | B60K 6/36 180/65.235 |
| 6,615,786 B2 | * | 9/2003 | Mori | F02N 7/00 123/179.31 |
| 6,692,394 B2 | * | 2/2004 | Takenaka | B60K 6/36 180/65.6 |
| 6,722,457 B2 | * | 4/2004 | Yamaguchi | B60W 10/06 180/65.235 |
| 6,757,598 B2 | * | 6/2004 | Okoshi | B60K 6/365 701/22 |
| 6,805,211 B2 | | 10/2004 | Fujikawa | |
| 6,811,508 B2 | * | 11/2004 | Tumback | B60K 6/445 475/5 |
| 6,840,341 B2 | | 1/2005 | Fujikawa | |

(Continued)

*Primary Examiner* — Charles A Fox
*Assistant Examiner* — Tinh T Dang
(74) *Attorney, Agent, or Firm* — David Kelley; Brooks Kushman P.C.

(57) ABSTRACT

A power-split hybrid transmission includes a direction reversing mechanism between the transmission input and a power-splitting planetary gear set. The transmission input is driven by an internal combustion engine. Engaging the direction reversing mechanism to drive the carrier in a direction opposite of engine rotation permits the transaxle to achieve higher output torque in reverse when using predominantly engine power. The direction reversing mechanism may also be used to hold the carrier stationary, providing a torque reaction to propel the vehicle with a generator, thus increasing the output torque in both directions when operating under only battery power.

3 Claims, 3 Drawing Sheets

(56) References Cited

U.S. PATENT DOCUMENTS

| | | | |
|---|---|---|---|
| 7,004,868 B2* | 2/2006 | Oshidari | B60K 6/365 475/5 |
| 7,576,501 B2 | 8/2009 | Okubo et al. | |
| 8,251,848 B2* | 8/2012 | Murakami | F16H 3/728 475/5 |
| 8,337,352 B2* | 12/2012 | Morrow | B60K 6/365 475/5 |
| 8,465,387 B2* | 6/2013 | Conlon | B60K 6/365 180/65.23 |
| 8,523,734 B2* | 9/2013 | Mepham | B60K 6/36 477/3 |
| 8,948,945 B2* | 2/2015 | Tsuneishi | B60K 6/547 701/22 |
| 9,050,971 B2* | 6/2015 | Atarashi | B60K 6/387 |
| 9,108,505 B2* | 8/2015 | Supina | B60K 6/547 |
| 9,221,327 B2* | 12/2015 | Ono | B60K 6/365 |
| 9,441,708 B2* | 9/2016 | Kimes | F16H 3/006 |
| 9,551,400 B2* | 1/2017 | Hiasa | B60K 6/365 |
| 9,623,868 B2* | 4/2017 | Hirasawa | B60W 20/50 |
| 9,896,084 B2* | 2/2018 | Iwase | B60W 20/40 |
| 9,969,255 B2* | 5/2018 | Kim | B60K 6/40 |
| 9,975,545 B2* | 5/2018 | Banshoya | B60K 6/365 |
| 10,001,206 B2* | 6/2018 | Fujii | F16H 57/12 |
| 10,023,180 B2* | 7/2018 | Suenaga | B60K 6/26 |
| 2002/0112901 A1* | 8/2002 | Yamaguchi | B60W 20/10 180/65.235 |
| 2015/0211620 A1* | 7/2015 | Matsubara | B60K 6/387 475/5 |
| 2015/0292600 A1* | 10/2015 | Al | B60K 6/365 475/5 |
| 2015/0298534 A1* | 10/2015 | Kitabatake | B60K 6/445 477/4 |
| 2016/0047439 A1* | 2/2016 | Kimes | F16H 3/006 475/5 |
| 2016/0273650 A1* | 9/2016 | Fujii | F16H 61/0265 |
| 2017/0282702 A1* | 10/2017 | Kim | B60K 6/26 |
| 2017/0313173 A1* | 11/2017 | Kimes | B60L 50/61 |
| 2018/0194214 A1* | 7/2018 | Oba | B60K 6/365 |

* cited by examiner

HYBRID TRANSAXLE

TECHNICAL FIELD

This disclosure relates to the field of vehicle transmissions. More particularly, the disclosure pertains to an arrangement of components in a hybrid transaxle.

BACKGROUND

Hybrid powertrains include energy storage devices such as batteries which are utilized to reduce fuel consumption by capturing braking energy and by permitting more efficient use of an internal combustion engine. The engine may be shut off while the vehicle is stationary. Also, the engine may be operated at higher power setting at which it is typically more efficient and then shut off a portion of the time that the vehicle is moving.

One type of hybrid powertrain is an electric power-split hybrid. At low speed, a planetary gear set divides the mechanical power generated by the internal combustion engine into two power flow paths. A portion of the power is conveyed to the drive wheels by gears, chains, or other mechanical power transfer components. The remaining power is directed to an electric machine and converted into electrical power. This electric machine is typically referred to as a generator although it may also be capable converting electrical power into mechanical power. A second electric machine drives the drive wheels. This second machine is typically referred to as a traction motor although it may be capable of converting mechanical power into electrical power. In some operating modes, all electrical power from the generator flows to the traction motor. In other operating modes, some electrical power may be diverted to a battery. In yet other operating modes, the battery may supplement the electrical power.

Internal combustion engines typically are only capable of rotating in one direction and must rotate at a minimum speed in order to generate substantial propulsive power. Electric machines, on the other hand, can typically rotate in either direction and can develop torque in either direction even at very low rotational speeds. In a conventional power-split hybrid, the mechanical power flow path is not capable of propelling the vehicle in reverse. In reverse, the electric machines provide the bulk of the propulsion. Consequently, the torque capability is less in reverse than in forward. This performance reduction is particularly severe if the battery state of charge is low and engine power must be used.

SUMMARY OF THE DISCLOSURE

A hybrid transmission includes a planetary gear set and a direction reversing mechanism. The planetary gear set has a sun, a carrier, and a ring. A first of these three components is fixedly drivably connected to a first electric machine. A second of these three components is fixedly drivably connected to a second electric machine and to an output. The direction reversing gearing arrangement alternately selectively drivably connects a third of the three components to an input shaft at two speed ratios. One of the speed ratios is negative and the other of the two speed ratios is positive. The direction reversing mechanism may include a first shift element, such as a selectable one-way clutch, that selectively couples the input shaft to the third component to establish the positive speed ratio. The direction reversing mechanism may further include first through fourth layshaft gears. The first layshaft gear is coupled to the input shaft. The second layshaft gear is fixedly drivably connected to the first layshaft gear. The third layshaft gear is coupled to the second layshaft gear. The fourth layshaft gear is coupled to the third component and fixedly driveably connected to the third layshaft gear. One of the coupled connections, such as that between the second and third gear, is a selective coupling via a second shift element. The remaining coupled connections may be fixed. One of the driveably connections is via directly meshing gears and the other is via an idler gear.

In another embodiment, a hybrid transmission includes a planetary gear set and a gearing arrangement. The planetary gear set includes a sun fixedly drivably connected to a first electric machine, a ring fixedly driveably connected to a second electric machine and to an output, and a carrier. The gearing arrangement alternately driveably connects the carrier to an input shaft at two speed ratios. A first of the speed ratios is negative and a second of the speed ratios is positive. The gearing arrangement may include a first shift element, such as a selectable one-way clutch, that selectively couples the input shaft to the carrier to establish the positive speed ratio. The gearing arrangement may further include first through fourth layshaft gears. The first layshaft gear is coupled to the input shaft. The second layshaft gear is fixedly drivably connected to the first layshaft gear. The third layshaft gear is coupled to the second layshaft gear. The fourth layshaft gear is coupled to the carrier and fixedly driveably connected to the third layshaft gear. One of the coupled connections, such as that between the second and third gear, is a selective coupling via a second shift element. The remaining coupled connections may be fixed. One of the driveably connections is via directly meshing gears and the other is via an idler gear.

A vehicle includes a planetary gear set and a first shift element. The planetary gear set includes a sun fixedly driveably connected to a first electric machine, a ring fixedly driveably connected to a second electric machine and to vehicle wheels, and a carrier. The first shift element selectively establishes a first power flow path having a negative speed ratio between an engine crankshaft and the carrier. A second shift element may selectively establish a second power flow path having a positive speed ratio between the engine crankshaft and the carrier. A controller may engage the first and second shift elements simultaneously to hold the carrier against rotation, providing a torque reaction to propel the vehicle using the first electric machine.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotatable elements are fixedly coupled to one another if they are constrained to have the same rotational speed about the same axis in all operating conditions. Rotatable elements can be fixedly coupled by, for example, spline connections, welding, press fitting, or machining from a common solid. Slight variations in rotational displacement between fixedly coupled elements can occur such as displacement due to lash or shaft compliance. In contrast, two or more rotatable elements are selectively coupled by a shift element when the shift element constrains them to have the same rotational speed about the same axis whenever it is fully engaged and they are free to have distinct speeds in at least some other operating condition. Two rotatable elements are driveably connected if they are connected by a power flow path that constrains their rotation speeds to be proportional with a predetermined speed ratio. If the power flow path is established in all operating conditions, then the components are fixedly driveably connected. If the power flow path is established only when one or more shift elements are engaged, then the components are selectively driveably connected.

Figure 1:
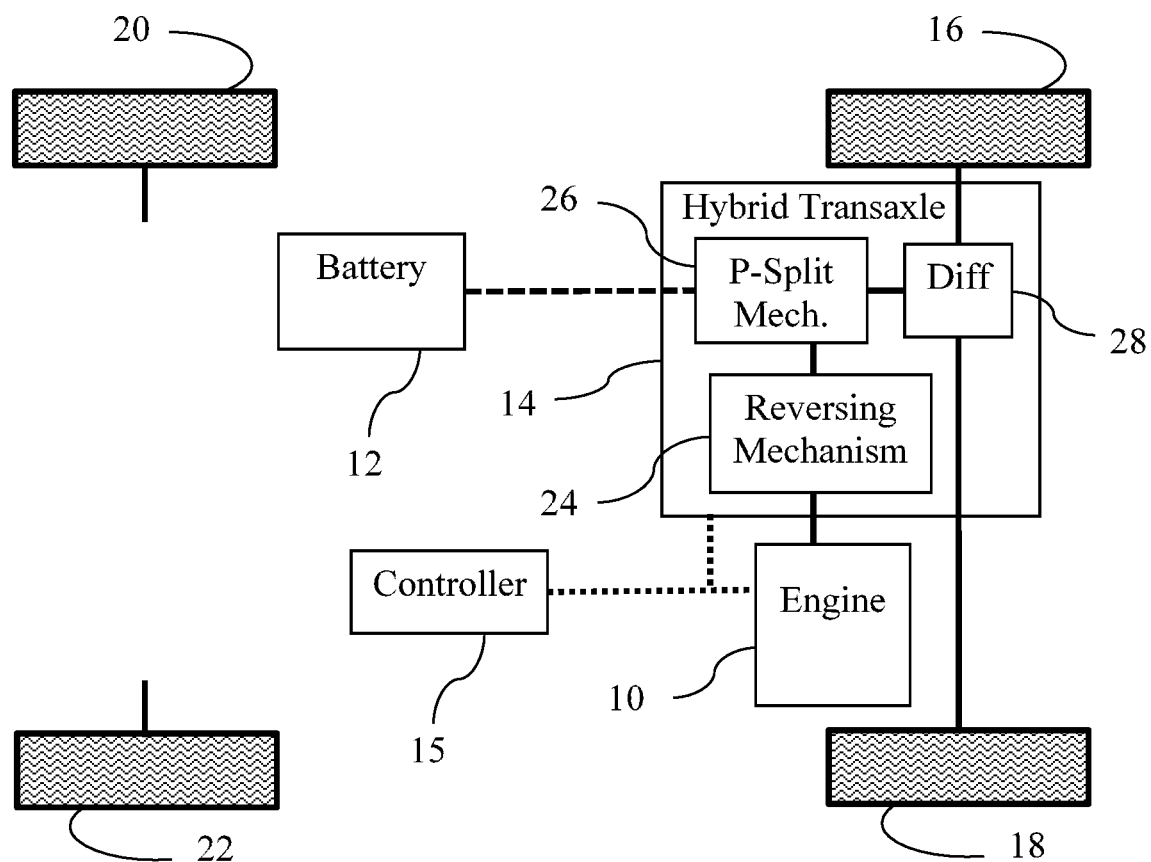
FIG. 1 is a schematic diagram of a hybrid electric vehicle.

FIG. 1 illustrates a front wheel drive vehicle powertrain. Mechanical power is supplied by internal combustion engine 10. Electrical energy is supplied by, and at some points in time drawn from, battery 12. Hybrid transaxle 14 combines power from these power sources, based on commands from controller 15, and delivers the power to front wheels 16 and 18. During regenerative braking, hybrid transaxle 14 draws mechanical power from wheels 16 and 18, converts it to electric power, and stores it in battery 12. Rear wheels 20 and 22 are not powered unless additional hardware is provided.

Hybrid transaxle 14 includes several subsystems. Reversing mechanism 24 draws mechanical power from the crankshaft of engine 10 and delivers it to an input of the power-split mechanism. In a forward operating mode, the crankshaft and the power split mechanism input rotate in the same direction. In a reverse operating mode, the input of the power split mechanism rotates in the opposite direction of the engine crankshaft. Power-split mechanism 26 controls the flow of power among the input, an output, and battery 12. The output of the power-split mechanism 26 drives differential 28, which divides the power between the front wheels while allowing slight speed differences such as when the vehicle turns a corner.

Figure 2:
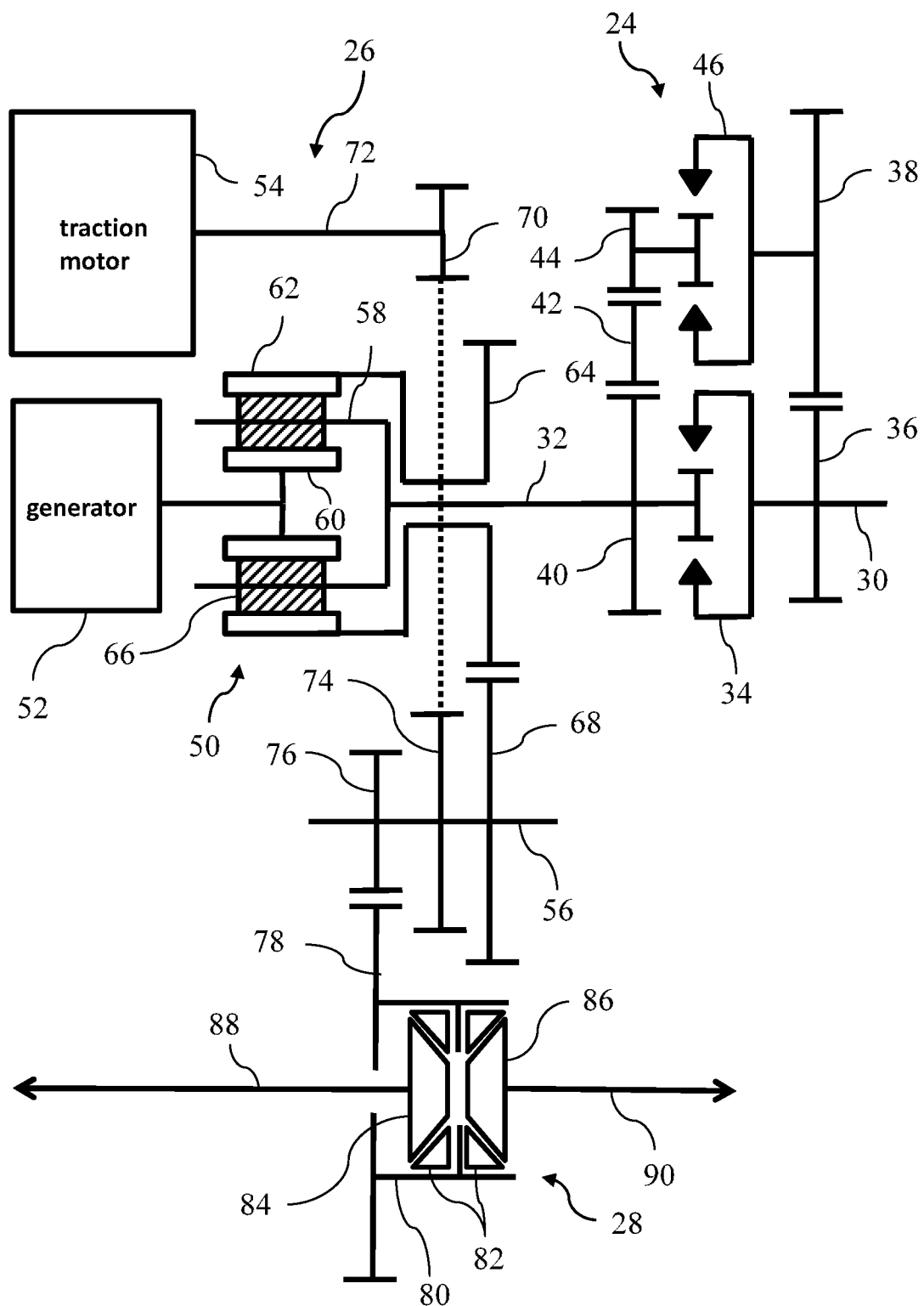
FIG. 2 is a schematic diagram of a first embodiment of a hybrid transaxle suitable for use in the hybrid electric vehicle of FIG. 1.

FIG. 2 illustrates a kinematic arrangement for a power-split hybrid transaxle 14. Power from internal combustion engine 10 is provides at input shaft 30, which is adapted for fixation to the engine crankshaft. Direction reversing gearing arrangement 24 is configured to alternately selectively driveably connect intermediate shaft 32 to input shaft 30 at two speed ratios including a positive speed ratio and a negative speed ratio. Selectable one-way clutch (SOWC) 34 is a controllable device with at least two states. See, for example, the device described in U.S. patent application Ser. No. 15/405,664 filed Jan. 13, 2017, now U.S. Pat. No 10,024,370. In a disengaged state, SOWC 34 does not transmit any torque and does not constrain the relative speeds of input shaft 30 and intermediate shaft 34. In an engaged state, SOWC 34 constrains input shaft 30 to rotate no faster than intermediate shaft 32. In the engaged state, SOWC 34 may transmit torque from input shaft 30 to intermediate shaft 32 when the two shafts are at the same speed. Any attempt to transmit torque in the other direction while in the engaged state causes the SOWC to over-run. SOWC 34 also has a locked state in which the speeds are constrained to be equal and torque may be transmitted in either direction. In a forward hybrid drive mode, a transmission controller commands SOWC 34 to be in either the engaged state or the locked state, selectively driveably connecting input shaft 30 to intermediate shaft 32. In a reverse hybrid drive mode, the transmission controller commands SOWC 34 to be in the disengaged state.

Gear 36 is fixedly coupled to input shaft 30 and meshes with gear 38. Gear 40 is fixedly coupled to intermediate shaft 32 and meshes with idler gear 42. Idler gear 42 meshes with gear 44. In the reverse hybrid drive mode, the controller commands SOWC 46 into an engaged state or a locked state to selectively couple gear 38 to gear 44. In this condition, input shaft 30 is driveably connected to intermediate shaft 32 with a negative speed ratio. The tooth numbers for these gears may be selected such that the speed of intermediate shaft 32 is lower in absolute value than the speed of input shaft 30. In the forward hybrid drive mode, SOWC is commanded to the disengaged state. In alternative embodiments, gear 38 may be fixedly coupled to gear 44 and SOWC 46 may selectively couple components that are fixedly coupled in the embodiment of FIG. 2. In alternative embodiments, one or both of SOWC 34 and 46 may be replaced with friction clutches, dog clutches, or other types of controllable coupling devices.

At relatively low vehicle speeds, the engine power transmitted by intermediate shaft 32 is split into two power flow paths by planetary gear set 50. One of the power flow paths is entirely mechanical. In the other power flow path, mechanical power is converted into electrical power by generator 52 and then converted back into mechanical power by traction motor 54. In some operating conditions, some power in this electrical power flow path may be diverted to battery 12 for later use. In other operating conditions, power from battery 12 may be added to the electrical power flow path. The power of the two power flow paths is combined at countershaft 56 before being delivered to vehicle wheels via differential 28. Generator 52 and traction motor 54 are both reversible electric machines capable of converting mechanical power into electrical power and vice versa. They may be, for example, synchronous AC motors connected to a DC bus via corresponding inverters. At higher vehicle speeds, power may flow in the opposite direction in the electrical power flow path, establishing a recirculating power condition.

The carrier 58 of planetary gear set 50 is fixedly coupled to intermediate shaft 32. The sun gear 60 is fixedly coupled to the rotor of generator 52. Ring gear 62 is fixedly coupled to gear 64. In alternative embodiments, some of these connections may be reversed, such as connecting gear 64 to the carrier while connecting the intermediate shaft to the ring. A set of planet gears 66 is supported for rotation with respect to carrier 58 and meshes with both sun gear 60 and ring gear 62.

Countershaft 56 is supported for rotation about a countershaft axis parallel to and offset from the input axis. Gear 68 is fixedly coupled to the countershaft 56 and meshes with gear 64. Gears 64 and 68 constitute the mechanical power flow path. The rotor of traction motor 54 is supported for rotation about a third axis parallel to and offset from the input and countershaft axes. Gear 70 is fixedly coupled to a rotor shaft 72 of traction motor 54. Gear 74 is fixedly coupled to countershaft 56 and meshes with gear 70 to transfer mechanical power from the traction motor to the countershaft.

Gear 76 is fixedly coupled to countershaft 56 and meshes with differential ring gear 78. Differential ring gear 78 is fixedly coupled to a carrier 80 of the differential 28. A number of beveled planet gears 82 are supported for rotation with respect to differential carrier 80. The beveled planet gears each mesh with both left and right beveled side gears 84 and 86. The left and right side gears 84 and 86 are fixedly coupled to left and right half-shafts 88 and 90, respectively to transfer power to left and right wheels. Differential ring gear 78, differential carrier 80, and left and right side gears 84 and 86 are all supported for rotation about a differential axis. Left and right half-shafts 88 and 90 may include universal joints to accommodate slight differences between the differential axis and the axes of rotation of the left and right wheels.

The vehicle may be operated in an electric drive mode in either forward or reverse. In the electric drive mode, SOWCs 34 and 46 are both commanded to the locked state. This forces both input shaft 30 and intermediate shaft 32 to be stationary. To propel the vehicle, either traction motor 54, generator 52, or a combination of the two are commanded to generate torque. Torque generated by traction motor 54 is transmitted to countershaft 56 via gears 70 and 74. Intermediate shaft 32 holds carrier 58 stationary such that planetary gear set 50 multiplies the torque of generator 52 and delivers it to ring gear 62 from which is transmitted to countershaft 56 by gears 64 and 68. The maximum torque capability in electric drive mode is higher than a power-split hybrid without direction reversing mechanism 24 because both electric machines contribute to the output torque. Conventional power-split hybrids do not have an ability to provide a reaction torque to generator 52 unless additional hardware is provided for that purpose.

It may become necessary to start the engine due to high driver torque demand, low battery state of charge, or other reasons. To transition from electric drive mode to forward hybrid drive mode is accomplished in several steps. First, traction motor 54 is commanded to provide enough torque to satisfy the driver demand and generator 52 is commanded to provide negligible torque. With generator 54 providing negligible torque, SOWC 46 will be effectively unloaded and can be commanded into the disengaged state. Once SOWC 46 is disengaged and SOWC 34 is locked, generator 52 is commanded to generate torque to crank the engine. The reaction torque is provided by gear 64 resulting in negative wheel torque. Traction motor 54 may be commanded to generate additional torque during cranking to compensate. Once the engine is started, it may be commanded to generate propulsive torque. The engine torque is reacted by the generator 52.

Transitioning from electric drive mode to reverse hybrid drive mode is accomplished similarly, except that SOWC 34 is disengaged instead of disengaging SOWC 34. In the reverse hybrid drive mode, engine torque is reversed in direction and may be multiplied by direction reversing mechanism 24. This negative torque is multiplied again by gear set 50 with generator 52 providing a reaction torque. Unlike a conventional power-split hybrid, the engine provides a positive contribution to wheel torque. Consequently, torque capability in reverse hybrid mode is substantially increased.

To transition from either hybrid drive mode to the electric drive mode, the locked SOWC is commanded into the disengaged state and the engine is commanded to shut off. Then, generator 52 is commanded to a speed which causes intermediate shaft 32 to be stationary. Once intermediate shaft 32 is stationary, both SOWCs are commanded into the locked state.

The transmission may also transition directly from the reverse hybrid drive mode to the forward hybrid drive mode. During this transition, there is no need to start the engine because it is already running. First, generator 52 is commanded to negligible torque and SOWC 46 is disengaged. Then, generator 52 is controlled to a speed that results in SOWC 34 being in an over-running condition. While in the over-running condition, SOWC 34 is commanded into the engaged state. Then, generator 52 is commanded to change speed to put SOWC 34 into a load carrying condition. In the load carrying condition, SOWC 34 may be commanded into the locked state if desired. A transition from forward hybrid drive mode directly to reverse hybrid drive mode is analogous.

Each of the transitions described above may be accomplished with the vehicle stationary, moving forward, or moving backwards. During the transitions, propulsion may be provided by traction motor 54 to satisfy driver demand.

Figure 3:
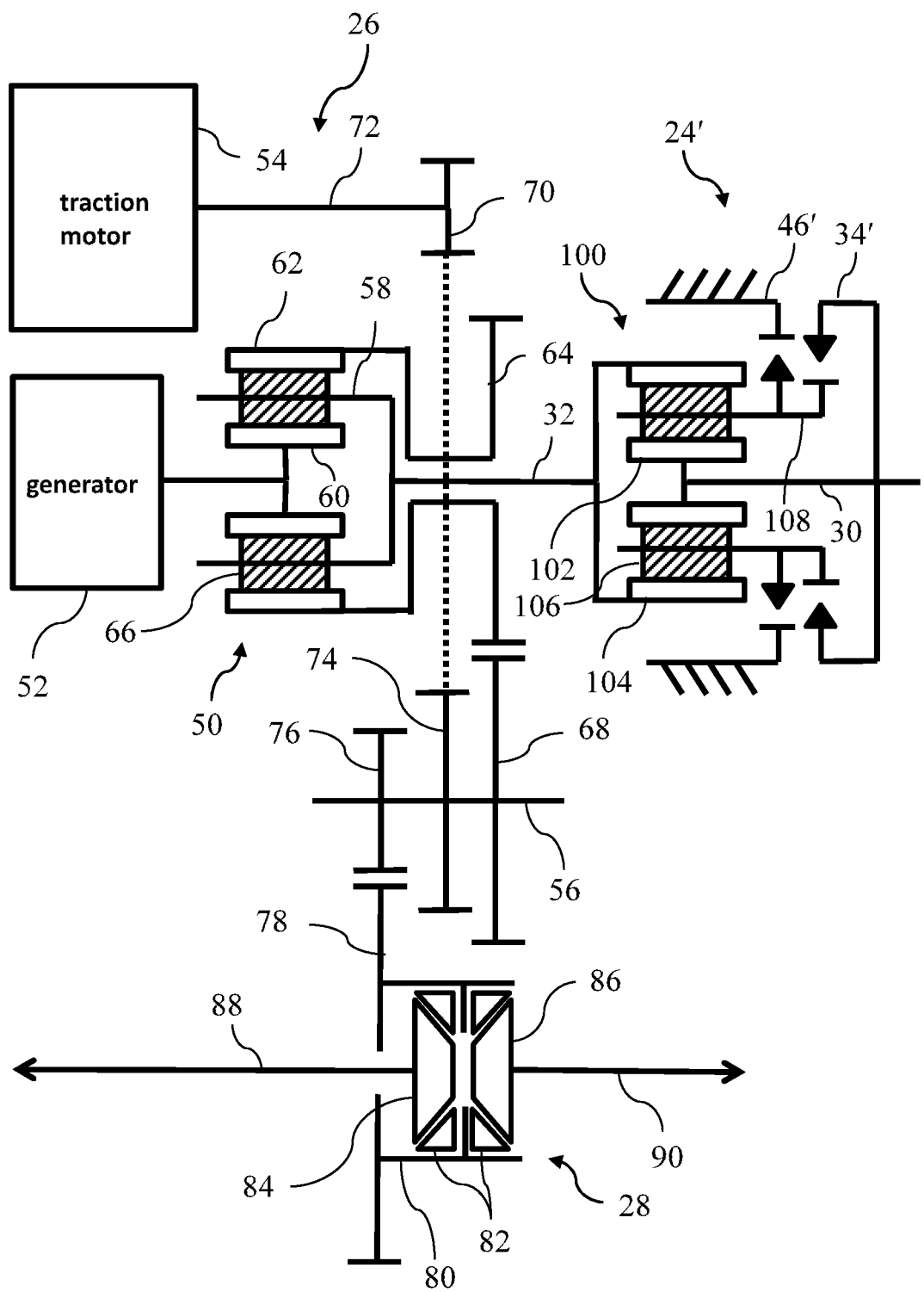
FIG. 3 is a schematic diagram of a second embodiment of a hybrid transaxle suitable for use in the hybrid electric vehicle of FIG. 1.

FIG. 3 illustrates an alternative kinematic arrangement for a power-split hybrid transaxle 14. Components that are unchanged from the embodiment of FIG. 2 have the same reference number. Components that are structurally different but perform the same function as a corresponding component in FIG. 2 are denoted by a prime ('). Direction reversing mechanism 24' uses planetary gear set 100 instead of the layshaft gearing of FIG. 2. Sun gear 102 is fixedly coupled to input shaft 30. Ring gear 104 is fixedly coupled to intermediate shaft 32. Planet gears 106 are supported for rotation with respect to carrier 108 and mesh with both sun gear 102 and ring gear 104. SOWC 34' selectively couples input shaft to carrier 108. When SOWC 34' is locked or engaged an not over-running, intermediate shaft 32 rotates in the same direction and at the same speed as input shaft 30. SOWC 46' selectively couples carrier 108 to the transmission housing. When SOWC 46' is locked or engaged and not over-running, intermediate shaft 32 rotates in the opposite direction as input shaft 30 and at a slower absolute speed. When both SOWCs 34' and 46' are locked, input shaft 30 and intermediate shaft 32 are both held stationary.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A hybrid transmission comprising:
    a planetary gear set having a sun, a carrier, and a ring wherein a first of the sun, the carrier, and the ring is fixedly driveably connected to a first electric machine and a second of the sun, the carrier, and the ring is fixedly driveably connected to a second electric machine and to an output; and
    a direction reversing gearing arrangement configured to alternately selectively driveably connect a third of the sun, the carrier, and the ring to an input shaft at two speed ratios, a first of the speed ratios being negative and a second of the speed ratios being positive, wherein the direction reversing gearing arrangement comprises,
        a first shift element configured to selectively couple the input shaft to the third of the sun, the carrier, and the ring to establish the positive speed ratio,
        a first layshaft gear coupled to the input shaft,
        a second layshaft gear fixedly driveably connected to the first layshaft gear,
        a third layshaft gear coupled to the second layshaft gear,
        a fourth layshaft gear coupled to the third of the sun, the carrier, and the ring and fixedly driveably connected to the third layshaft gear, and
        a second shift element configured to selectively couple the third layshaft gear to the second layshaft gear to establish the negative speed ratio, the first layshaft gear being fixedly coupled to the input shalt and the fourth layshaft gear being fixedly coupled to the third of the sun, the carrier, and the ring.

2. The hybrid transmission of claim 1 wherein the first shift element is a selectable one-way clutch.

3. The hybrid transmission of claim 1 wherein the second shift element is a selectable one-way clutch.

* * * * *